United States Patent
Ishikawa

[11] Patent Number: 6,066,063
[45] Date of Patent: May 23, 2000

[54] DIFFERENTIAL APPARATUS

[75] Inventor: Yasuhiko Ishikawa, Tochigi, Japan

[73] Assignee: Tochigi Fuji Sangyo Kabushiki Kaisha, Japan

[21] Appl. No.: 09/075,452

[22] Filed: May 8, 1998

[30] Foreign Application Priority Data

May 8, 1997 [JP] Japan ................... P9-118299

[51] Int. Cl.[7] ................................. F16H 48/22
[52] U.S. Cl. ............................ 475/234; 475/231
[58] Field of Search ................... 475/230, 231, 475/238, 239, 233, 234, 236; 192/66.2, 66.21, 70.15, 113.36, 48.91

[56] References Cited

U.S. PATENT DOCUMENTS

| | | | |
|---|---|---|---|
| 1,445,865 | 2/1923 | Alden | 475/228 |
| 2,971,404 | 2/1961 | Thornton | 475/234 |
| 3,186,258 | 6/1965 | Meldola | 475/234 |
| 3,327,563 | 6/1967 | Engle | 475/234 |
| 3,344,688 | 10/1967 | Frost | 475/234 |
| 4,169,394 | 10/1979 | Estrada | 475/234 |
| 5,226,861 | 7/1993 | Engle | 475/234 |
| 5,556,344 | 9/1996 | Fox | 475/234 |
| 5,671,835 | 9/1997 | Tanaka et al. | 192/113.36 X |
| 5,682,971 | 11/1997 | Takakura et al. | 192/113.36 X |
| 5,799,762 | 9/1998 | Hinkel et al. | 192/3.29 |

*Primary Examiner*—Charles A Marmor
*Assistant Examiner*—Ha Ho
*Attorney, Agent, or Firm*—Graham & James LLP

[57] ABSTRACT

Drive torque input to a rotatable differential case (3) is differentially distributed, through a pinion gear (25) rotatably supported by the different al case, to a pair of torque outputting side gears (27, 29) accommodated in the differential case and meshing at their toothed portions (27b, 29b) with the pinion gear, and a pair of difference limiting clutches (35, 37) for frictionally slippingly coupling the differential case with the pair of side gears each comprise a frictional region (7b, 5b) of a cone frustum figure on an inner wall (7a, 5a) of the differential case, a frictional region (27d, 29d) of a cone frustum figure on an outer wall (27c, 29c) of a body portion (27a, 29a) of either side gear, and a taper ring (47) rotatably interposed between the frictional regions which have different average friction radii (r1, r2) generating different average frictional forces. The taper ring may be formed with oil grooves (55, 57), and may have projections (73) loose fitted in openings (49) in the wall of the differential case.

15 Claims, 11 Drawing Sheets r2>r1 r2<r1

DIFFERENTIAL APPARATUS

BACKGROUND OF THE INVENTION

1. Field of the Invention

The present invention generally relates to a differential apparatus for vehicles, and particularly, it relates to a differential apparatus for vehicles including a differential gear mechanism and a difference limiting clutch.

2. Description of Relevant Art

FIG. 1 illustrates a conventional differential apparatus 201 disclosed by Japanese Patent Application Laid-Open Publication No. 46-8206.

The conventional differential apparatus 201 includes a differential gear mechanism 213 of a bevel gear type composed of a pinion shaft 205 fixed to a differential case 203 rotatable as an input member, a pinion gear 207 rotatably supported on the pinion shaft 205, and a pair of left and side gears 209, 211 as output members meshing with the pinion gear 207. The left and right side gears 209, 211 are axially movably splined on left and right axle shafts 215, 217, respectively.

The left and right axle shafts 215, 217 have left and right inner clutch members 219, 219 as pressure exerting elements axially movably splined thereon, respectively, which clutch members 219, 219 are frictionally engageable with left and right outer clutch members 221, 221 as pressure receiving elements fixed to the differential case 203, respectively. In other words, the left and right inner/outer clutch members 219/221 and 219/221 have their frictionally engaging surface parts cooperatively constituting left and right conical clutches 223, 223. The conical clutches 223, 223 are each adapted to be let in (left or right gear train) with a reaction force acting on the left or right inner clutch member 219 from the left or right side gear 209, 211 in a meshing state, thereby limiting a difference (in phase between left and right gear trains) at the differential apparatus 213.

In the differential apparatus 201, each conical clutch 223 is constituted by using the pressure-receiving clutch member 221 fixed to the differential case 203.

To this point, there is a conventional differential apparatus in which, as shown in FIG. 2, a difference limiting conical clutch 225 has its frictionally engageable elements directly formed on a side gear 229 and a differential case 227.

As illustrated in FIG. 2, the conical clutch 225 has at each point on a frictional engagement region thereof an inner frictional radius r1 on the gear 229 side and an outer frictional radius r2 on the case 227 side, which radii r1, r2 equal each other, thus evenly sharing frictional torque to be born.

A typical differential case is made of a spheroidal graphite cast iron (FCD), and typical side gears are made of a case hardened steel (SCM). They are both subjected to a surface hardening process by way of a carbo-nitriding or nitriding to have an enhanced anti-abrasive nature. Some differential cases have a structure with dispersed carbon (graphite) particles, with a slightly increased abrasion tendency.

To provide the differential case with an improved anti-abrasive nature, there is necessitated a higher surface hardness or a different material, with a significant increase in cost.

In the differential apparatus 201 also, there is observed a similar issue between each pressure-exerting inner clutch member 219 and a corresponding pressure-receiving outer clutch member 221.

Moreover, in this conventional apparatus 201, a space 231 is provided between the outer clutch member 221 and the differential case 203, leaving a fixed part 233 of the clutch member 221 alone to bear frictional torque of a corresponding conical clutch 223, thus needing a high strength at the fixed part 233, costing high.

Further, as the differential case 203 simply faces (without supporting) an outer side of the pressure-receiving clutch member 221 subjected at its inner side to the reaction force from a corresponding side gear 209, 211 in the meshing state, this clutch member 221 has a decreased anti-deforming tendency that might haste been improved by e.g. increasing its plate thickness, with an increased weight and an increased cost.

SUMMARY OF THE INVENTION

The present invention has been achieved with such points in view.

It therefore is an object of the present invention to provide a differential apparatus having a difference limiting conical clutch arranged between an abrasive differential case and a side gear, with a reduced burden on the differential case and an improved durability.

To achieve the object, a first aspect of the invention provides a differential apparatus comprising a differential gear mechanism including a differential case to be driven to rotate with drive power from an engine, a pinion gear rotatably supported on the differential case, and a pair of side gears as output members coupled to each other through the pinion gear, and a difference limiting clutch to be let in with a meshing reaction force of either side gear, the difference limiting clutch comprising slidingly rotatable sloped surfaces provided on a side the either side gear is disposed and on a side the differential case is disposed, respectively, wherein the either side gear and the differential case have frictional coefficients thereof substantially equivalent to each other, and an average friction coefficient of the sloped surface on the differential case side is larger than an average friction coefficient of the sloped surface on the side gear side.

According to the first aspect, drive power from an engine drives a differential case to rotate about its axis of rotation together with a pinion gear, thereby driving both side gears, and is distributed to the side gears, to be transmitted to related road wheels. When a difference in phase develops between the road wheels, the side gears rotate relative to each other, causing the pinion gear meshing therewith to rotate about its axis of rotation, and a difference limiting clutch is let in between the differential case and the side gear at a corresponding side, with a meshing reaction force acting thereon from this side gear, so that a frictional force due to a total frictional resistance of the clutch limits the developing difference.

The difference limiting clutch comprises at least two frictionally slidingly rotatable sloped surfaces provided either on a side thereof, where the corresponding side gear exits, and the other on another side thereof, where the differential case exits. The sloped surfaces have their average friction radii. As the average friction radius of the sloped surface at the differential case side is set larger than that of the sloped surface at the side gears side, that sloped surface produces smaller frictional torque than this sloped surface, resulting in the less abrasion of the differential case side surface, with an improved durability.

Accordingly, it is unnecessary for the differential case to have an extra antiabrasive nature achieved by an increased surface hardness or by a changed material, thus avoiding a potential cost increase.

According to a second aspect of the invention, the difference limiting clutch further comprises a taper ring interposed between the either side gear and the differential case to have the average friction coefficient of the sloped surface on the differential case side larger than the average friction coefficient of the sloped surf ace on the side gear side.

According to the second aspect, a difference between an average friction radius at the differential gear side and an average friction radius at the side gears side can be set in a voluntary manner by changing a thickness of a taper ring or by changing inside and/or outside taper angles thereof, permitting a controlled abrasion at the differential case side.

Further, the taper ring fitted between the differential care and either side gear is kept from deforming even when exposed to a significant meshing reaction force of the side gear, unlike the conventional example of FIG. 1.

Accordingly, the taper ring does not need an increased thickness or changed material for a high strength, avoiding increases in weight and cost.

According to a third aspect of the invention, the taper ring is rotatable relative to the either side gear and the differential case.

According to the third aspect, as a taper ring is rotatable relative to both a side gear and a differential case, these members are substantially evenly abraded along rotation of the taper ring, sharing necessary frictional torque therebetween, with the more reduced abrasion quantity as well as the more improved durability. Further, the taper ring needs no measures for engagement with the side gear nor the differential case, thus permitting a simple structure facilitated of assemblage and reduced in cost.

According to a fourth aspect of the invention, the taper ring has an engaging part engageable with the differential case.

According to the fourth aspect, a taper ring is brought into engagement with a differential case, as the ring rotates. In the engaged state, the taper ring is rotatable together with the differential case, which is thus little abraded and has an anti-abrasive nature enhanced to some extent, without additional costs for a surface hardening or material change.

Moreover, a sloped surface at the differential case side has a restricted slide range, allowing for a surface processing to be performed in an inexpensive manner, with a moderate precision and a smaller number of processes.

Further, the sloped surface at the differential case side receives part of frictional torque of the taper ring, unlike the conventional example of FIG. 1, permitting an engaging part of the taper ring to have a moderate strength, avoiding an additional cost for a processing of the engaging part.

According to a fifth aspect of the invention, the differential apparatus further comprises at least one of an oil groove formed in the sloped surface on the differential case side, and an oil groove formed in a sliding surface of a taper ring interposed between the either side gear and the differential case.

According to the fifth aspect, an oil groove is formed in a sloped surface on a differential case side or in a sliding surface of a taper ring, permitting a reduced abrasion, allowing an improved durability.

The foregoing aspects may be defined from other aspects of the invention.

According to a sixth aspect of the invention, a differential apparatus comprises a differential case to be rotated about a first rotation axis with drive torque input thereto, a pinion gear integrally rotatable with the differential case about the first rotation axis and free rotatable about a second rotation axis crossing the first rotation axis, a first side gear rotatable about and slidable along the first rotation axis relative to the differential case, the first side gear being comprised of a body portion having an outer wall facing an inner wall of the differential case, and a toothed portion meshing with the pinion gear for outputting a first fraction of the drive torque distributed thereto, a second side gear rotatable about the first rotation axis relative to the differential case, the second side gear meshing with the pinion gear for outputting a second fraction of the drive torque distributed thereto, and a frictional clutch to be let in for frictionally slippingly coupling the inner wall of the differential case with the outer wall of the body portion of the first side gear, when a difference develops between the first and second fractions of the drive torque, the frictional clutch comprising a first frictional region on the inner wall of the differential case, the first frictional region having a radially outer figure of a frustum of a first cone symmetrical about the first rotation axis, a second frictional region on the outer wall of the body portion of the first side gear, the second frictional region having a radially outer figure of a frustum of a second cone symmetrical about the first rotation axis, an annular plate member interposed between the first and second frictional regions and rotatable about the first rotation axis relative to the differential case and the first side gear, a third frictional region on an outer side of the annular plate member, the third frictional region being frictionally slidably engageable over a total area thereof with a total area of the first frictional region, a fourth frictional region on an inner side of the annular plate member, the fourth frictional region being frictionally slidably engageable over a total area thereof with a total area of the second frictional region, and frictional force unbalancing means for unbalancing an average frictional force acting between the first and third frictional regions relative to an average frictional force acting between the second and fourth frictional regions, as the frictional clutch is let in.

According to the sixth aspect, when a difference of drive torque develops between two side gears as output members of a differential apparatus, a frictional clutch including an annular plate member is let in between a differential case of the apparatus and either side gear, for a coupling therebetween to be effected in a frictionally slipping manner. As the frictional clutch is let in, an average frictional force acting outside the annular plate member is unbalanced relative to an average frictional force acting inside thereof, i.e., that average frictional force is smaller or larger in magnitude than this average frictional force.

Therefore, if a replacement of the differential case costs higher than a replacement of the either side gear, for example, one can render smaller the average frictional force acting outside to provide the differential case with a less abrasion tendency, allowing a longer service life, thereby saving unfavorable expenses.

According to a seventh aspect of the invention, the frictional force unbalancing means comprises a difference between an average friction radius of the total area of the first frictional region with respect to the total area of the third frictional region and an average friction radius of the total area of the second frictional region with respect to the total area of the fourth frictional region.

According to the seventh aspect, a first and a third frictional region that may be defined as (radially outer) parts of (real or partially imaginary. e.g. dented) wider frictional (cone frustum) surfaces and may be continuous or interrupted (e.g. by oil grooves) have their total areas, and the total area of the first frictional region has an average frictional radius thereof defined with respect to the total area of the third frictional region (i.e. with respect to an engageable area), as this total area is frictionally slidably engageable (in any case as a whole) with (an entirety of and in some cases temporarily with a corresponding part of) that total area, when a (cone frustum to cone frustum) frictional clutch is effectively let in.

In this respect, a surface element in a vicinity of an arbitrary point on an arbitrary circle described about a first rotation axis, passing the first frictional region, is subjected to a magnitude of frictional torque depending on a radius of the circle times an average value of frictional forces acting thereon from surface elements on a corresponding circular segment of the third frictional region, as these surface elements sequentially slip on that surface element with a constant or variable frictional coefficient (e.g. to be 0 at a void), exerting pressures thereon. The magnitude of frictional torque is integrated over the total area of the first frictional region, and a total magnitude of frictional torque is represented by an average value (e.g. arithmetic mean or square root of square sum) of radii between an innermost circle and an outermost circle of the first frictional region, called "average frictional radius", as an integrated frictional force is supposed to be acting on a point of a circle described with the average frictional radius about the first rotation axis. The integrated frictional force may be averaged over the total area of the first frictional region to determine an average frictional force thereon.

Likewise, there is calculated an average friction radius of a total area of a second frictional region with respect to a total area of a fourth frictional region, and an average frictional force will be defined on the second frictional region in accordance with frictional torque acting thereon.

As the average friction radii are different, the average frictional force on the first frictional region has an unbalanced magnitude relative to the average frictional force on the second frictional region.

According to an eighth aspect of the invention, the frictional force unbalancing means comprises a thickness of the annular plate member.

According to the eighth aspect, an annular plate member is sufficiently thick for an ensured unbalancing of average frictional forces.

According to a ninth aspect of the invention, the frictional force unbalancing means comprises a difference between the radially outer figures o the frustums of the first and second cones.

According to the ninth aspect, a radially outer figure of a frustum of a first cone is effectively different from a radially outer figure of a frustum of a second cone, e.g. in form, inside and/or outside diameter of a frustum top disc, cone angle and/or frustum height, to have different average friction radii.

According to a tenth aspect of the invention, the frictional force unbalancing means comprises an opening in one of the inner wall of the differential case and the annular plate member, and a projection on the other thereof, the projection being engageable with the opening, as the annular plate member rotates relative to the differential case.

According to the tenth aspect, an annular plate member is interlocked with a differential case after an initial phase of frictional slip, unless a direction of relative rotation changes. During the initial phase, there develops an unbalanced average frictional force acting on the differential case. In an interlocked state, the annular plate member does not make a relative rotation to the differential case, thus simply exerting thrust forces thereto. In this state, therefore, the average frictional force on a first frictional region is minimized substantially to a zero, i.e., extremely unbalanced relative to an average frictional force on a second frictional region.

According to an eleventh aspect of the invention, the annular plate member has a plurality of oil grooves formed in one of the inner and outer sides thereof.

According to the eleventh aspect, lubricant is additionally spread over at least either side of an annular plate member, reducing the magnitude of an average frictional force.

According to a twelfth aspect of the invention, the plurality of oil grooves extend in different tangential directions of a circle having a center thereof on the first rotation axis.

According to the twelfth aspect, lubricant effectively spreads tangentially (at angles to radial directions) even when an annular plate member rotates at a relatively low angular speed.

According to a thirteenth aspect of the invention, the plurality of oil grooves extend in a circumferential direction of a circle having a center thereof radially offset from the first rotation axis.

According to the thirteenth aspect, flowing lubricant is effectively held on an annular plate member, without undue stagnation.

According to a fourteenth aspect of the invention, the inner wall of the differential case is formed with an opening, and the annular plate member has a projection loose-fitted in the opening.

According to the fourteenth aspect, frictional slippage is restricted, allowing for a difference limitation to be effected with an increased sensitivity.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
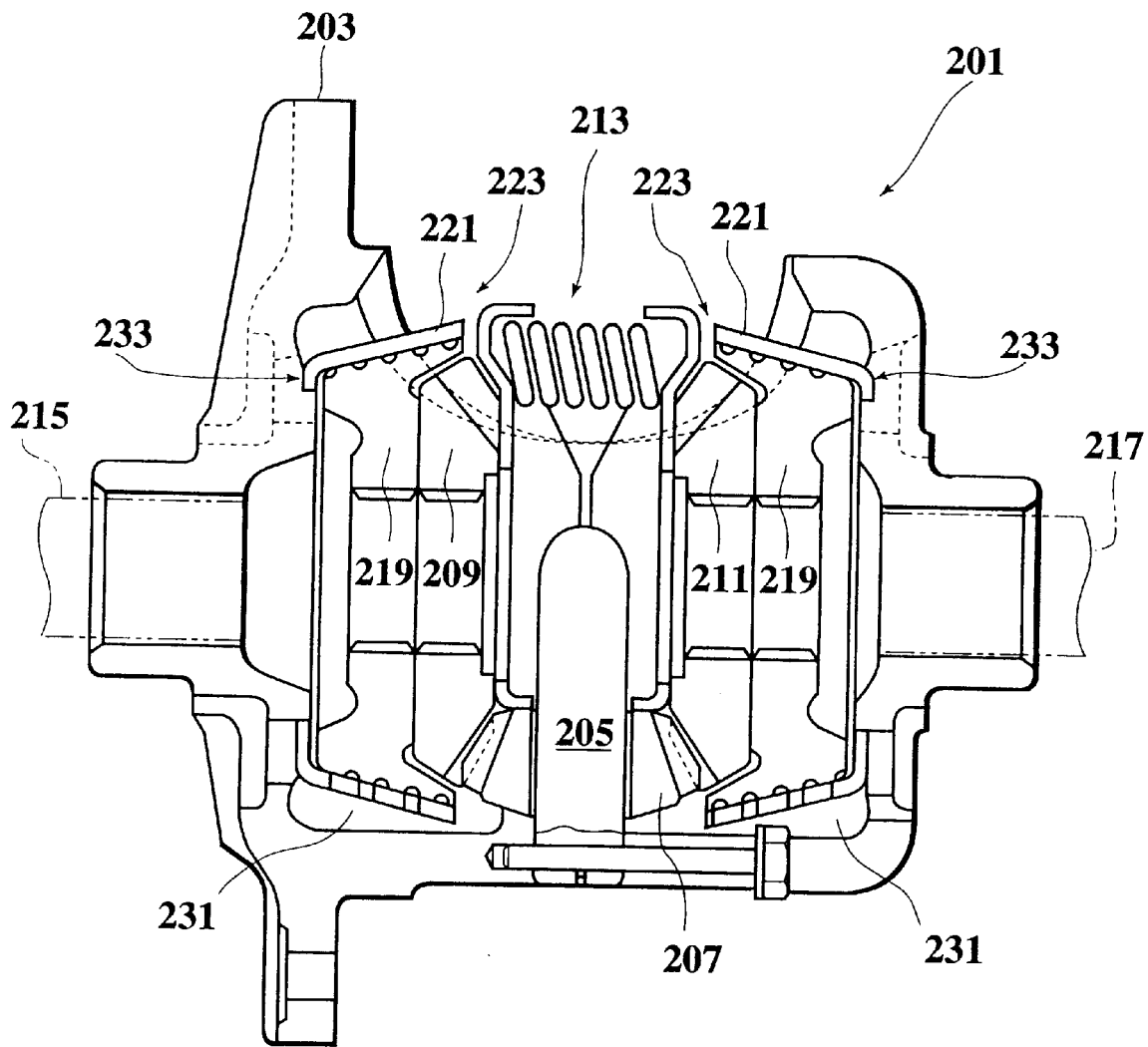
FIG. 1 is a section of a conventional differential apparatus.
Figure 2:
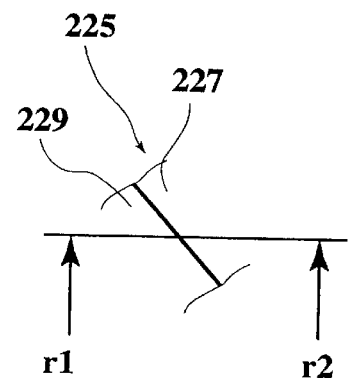
FIG. 2 is a schematic section of a conical clutch of another conventional differential apparatus.

There will be detailed below the preferred embodiments of the present invention with reference to the accompanying drawings. Like members are designated by like reference characters.

Figure 3:
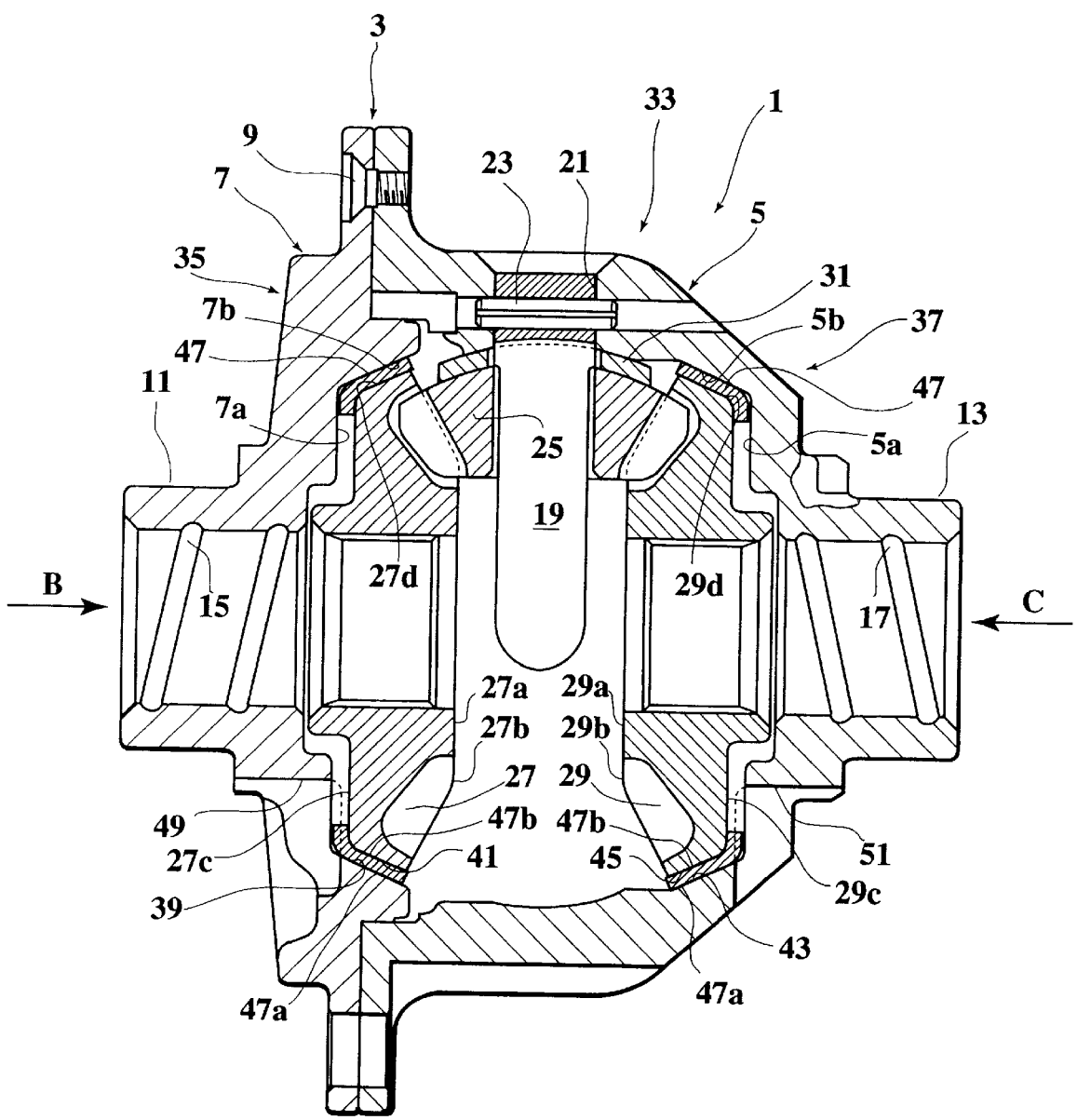
FIG. 3 is a section of a differential apparatus according to a first embodiment of the invention, as it is taken along line A—A of FIG. 4.

A first embodiment of the present invention will be described with reference to FIGS. 3 to 15. The first embodiment has features addressed to the first to the third, the fifth to the ninth, and the eleventh to the thirteenth aspect of the invention. FIG. 3 shows a differential apparatus 1 according to the first embodiment.

The differential apparatus 1 has a differential case 3 as an input-torque receiving member rotatable about a horizontal rotation axis with drive torque transmitted thereto from an unshown engine of an automobile. The differential case 3 comprises a substantially cylindrical case body 5 defining a gear chamber open to the left in the figure, and a side cover 7 closing a left side of the case body 5. The side cover 7 is tight-fastened to the case body 5 by a plurality of bolts 9.

The case body 5 and the side cover 7 are made of a spheroidal graphite cast iron (FCD 450–600), and have hardened skins such as by a carbo-nitriding or nitriding, with an enhanced anti-abrasive nature.

The differential case 3 is arranged inside an unshown differential gear carrier, and rotatably supported at left and right bosses 11, 13 thereof with bearings fixed in the differential carrier. The differential carrier has an oil reservoir, and the left and right bosses 11, 13 of the differential case 3 have spiral oil grooves 15, 17 formed in inner circumferences thereof, respectively, for guiding lubricant from the oil reservoir into the differential case 3.

The differential case 3 has an unshown ring gear fitted thereon and bolted thereto. The ring gear meshes with a drive gear of a drive power train connected to the engine of the automobile. The differential case 3 is thus driven to rotate with drive torque transmitted thereto from the engine A through the drive power train.

The differential case 3 has therein a plurality of equiangularly spaced pinion shafts 19 extending in radial directions thereof. The pinion shafts 19 are each fitted at an outer end thereof in a hole 21 opened through a wall of the case body 5, and are each nonrotatably stopped with a spring pin 23 inserted therethrough in an axial direction of the differential case 3. Each pinion shaft 19 has a bevel pinion gear 25 free rotatably fitted thereon. The pinion gear 25 meshes with respective toothed portions 27b, 29b of a pair of left and right bevel side gears 27, 29 as drive-torque outputting members axially slidably splined on inner ends of unshown left and right front or rear axles of the automobile, while the axles are rotatably inserted through the bosses 15, 17 of the differential case 3.

The side gears 27, 29 are made of a case hardened steel (SCM). They both have hardened skins such as by a carbo-nitriding or nitriding, with an enhanced anti-abrasive nature.

Between a radially outer side of the bevel pinion gear 25 and the wall of the case body 5, there is interposed a spherical washer 31 for receiving centrifugal forces from and radial components of meshing reaction forces of the pinion gear 25. The meshing reaction forces of the pinion gear 25 have their axial components acting on the left and right bevel side gears 27, 29 which are thereby axially outwardly urged.

The differential apparatus 1 includes a bevel gear type differential gear mechanism 33 constituted as described above.

Drive torque from the engine is input via the ring gear to the differential apparatus 1, where it drives the differential case 3 to be rotated about the horizontal rotation axis, together with the pinion shaft 19 and the pinion gear 25 thereon, and has its fractions distributed to the left and side right side gears 27, 29 engaged with the pinion gear 25, to be output via the left and right axles to a pair of left and right road wheels of the automobile, respectively. If either road wheel experiences a faster rotation than the other, such as when turning the automobile to the left or right, one of the side gears 27, 29 at a corresponding side is rotated faster than the other, having an angular or phase difference developed therebetween, which is absorbed by a corresponding relative rotation between the side gears 27, 29, as it is permitted by a corresponding rotation of the pinion gear 25 about the pinion shaft 19, with a varying proportion between the fractions of drive torque differentially distributed to the left and right side gears 27, 29 in dependence on a difference between resistive forces acting on the road wheels from a road that may not be always comfortable.

In this respect, the differential apparatus 1 includes a pair of left and right so-called conical clutches 35, 37 as difference limiting frictional clutches to be let in (i.e. effective) between the differential case 3 and the left and right side gears 27, 29, when these gears 27, 29 are rotated relative to each other (with a developing difference in rotation angle and drive torque distribution), making their relative rotations to the differential case 3. The left clutch 35 is provided between the side cover 7 of the differential case 3 and a body portion 27a of the left side gear 27, and comprises a pair of radially outer and inner sloped so-called conical frictional surfaces 39, 41, which are formed on the side cover 7 and the side gear 27, respectively. The right clutch 37 is provided between the case body 5 of the differential case 3 and a body portion 29a of the right side gear 29, and comprises a pair of radially outer and inner sloped so-called conical frictional surface(-element)s 43, 45, which are formed on the case body 5 and the side gear 29, respectively.

More specifically, the differential apparatus 1 has on each axial side thereof a frictional clutch 35/37 to be let in for frictionally slippingly coupling a radially inner wall 7a/5a (i.e. an inner wall 7a of the side cover 7 or an inner wall 5a of the case body 5) of the differential case with a radially outer wall 27c/29c of the body portion 27a/29a of the left or right side gear 27/29, when a difference develops between fractions of drive torque distributed thereto, and the frictional clutch 35/37 comprises: an outermost frictional region 7b/5b defined on the inner wall 7a/5a of the differential case 3, in the form of a radially outer figure of a frustum of an outer imaginary cone symmetrical about the horizontal rotation axis; an innermost frictional region 27d/29d defined on the outer wall 27c/29c of the body portion 27a/29a of the side gear 27/29, in the form of a radially outer figure of a frustum of an inner imaginary cone symmetrical about the horizontal rotation axis; an annular plate member 47/47 (hereafter sometimes called "taper ring") interposed between the outermost and innermost frictional regions 7b/5b and 27d/29d and rotatable about the horizontal rotation axis relative to the differential case 3 and the side gear 27/29; an outer frictional region 47a/47a defined on an outer side of the annular plate member 47/47 and configured to be frictionally slidably engageable over a total area thereof with a total area of the outermost frictional region 7b/5b; an inner frictional region 47b/47b defined on an inner side of the annular plate member 47/47 and configured to be frictionally slidably engageable over a total area thereof with a total area of the innermost frictional region 27d/29d; and a variety of later-described measures for unbalancing an average frictional force acting between the outermost and outer frictional regions 7b/5b and 47a/47a relative to an average frictional force acting between the innermost and inner frictional regions 27d/29d and 47b/47b, in order to keep that average frictional force sufficiently smaller than this average frictional force to provide the differential case 3 with a significantly enhanced anti-abrasive nature, as the frictional clutch 35/37 is let in.

In other words, the radially outer and inner conical surfaces 41, 39 of the left clutch 35 comprise (when the taper ring 47 is concerned) the outermost region 7b and the innermost region 27d, respectively, and (when the left conical crutch 35 is concerned) a combination of the outermost and outer (skin) regions 7b and 47a and a combination of the innermost and inner (skin) regions 27d and 47b, respectively. Likewise, outer and inner conical surfaces 43, 45 of the right clutch 37 comprise (when the taper ring 47 is concerned) the outermost region 5b and the innermost region 29d, respectively, and (when the right conical clutch 37 is concerned) a combination of the outermost and outer (skin) regions 5b and 47a and a combination of the innermost and inner (skin) regions 29d and 47b, respectively.

The outer and inner conical surfaces 39/43 and 41/45 have their frictional coefficients substantially equivalent to each other, i.e., between the differential case 3(7/5) side and the side gear 27/29 side.

Figure 6:
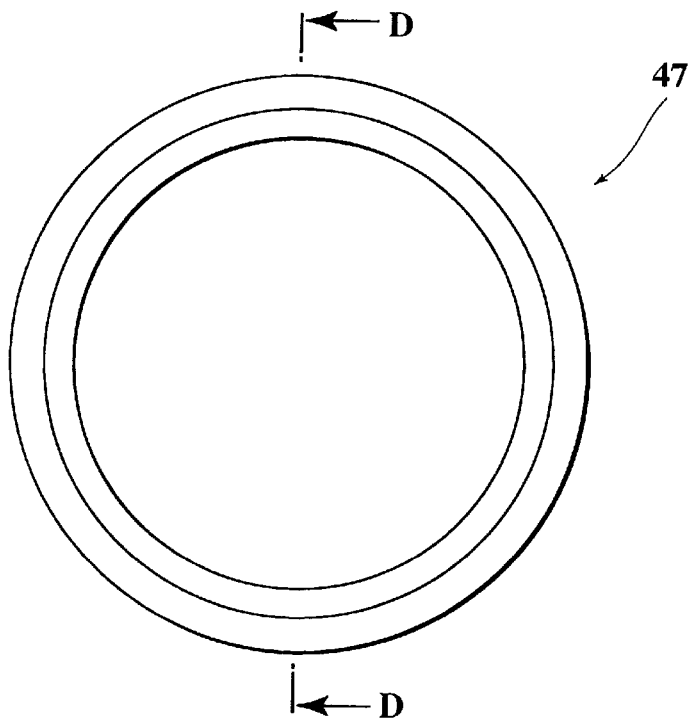
FIG. 6 is a front view of a taper ring of the differential apparatus of FIG. 3.
Figure 7:
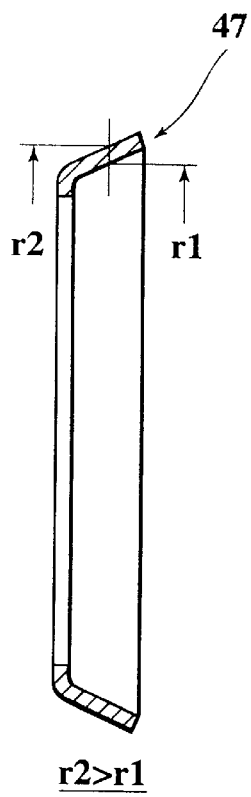
FIG. 7 is a section of the taper ring of FIG. 6, as it is taken along line D—D of FIG. 6.
Figure 8:
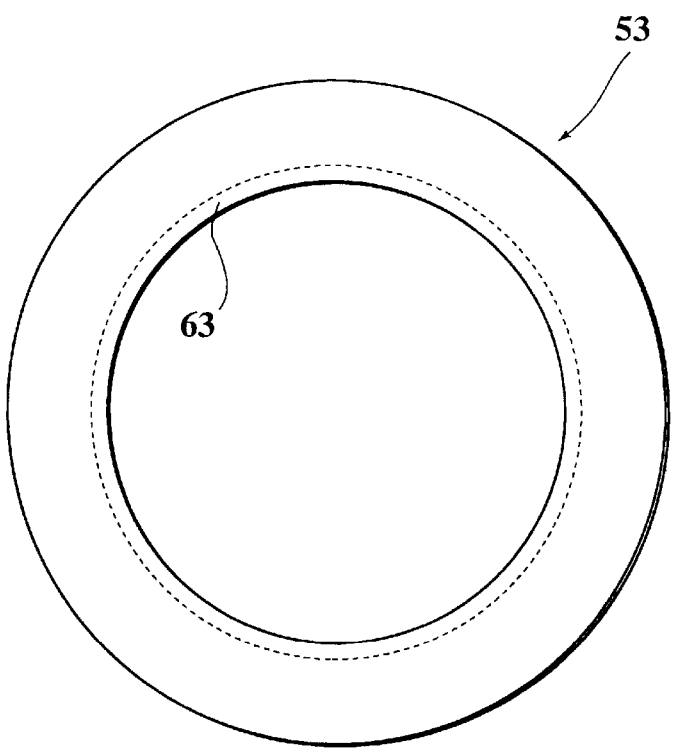
FIG. 8 is an exploded view of the taper ring of FIG. 6.
Figure 9:
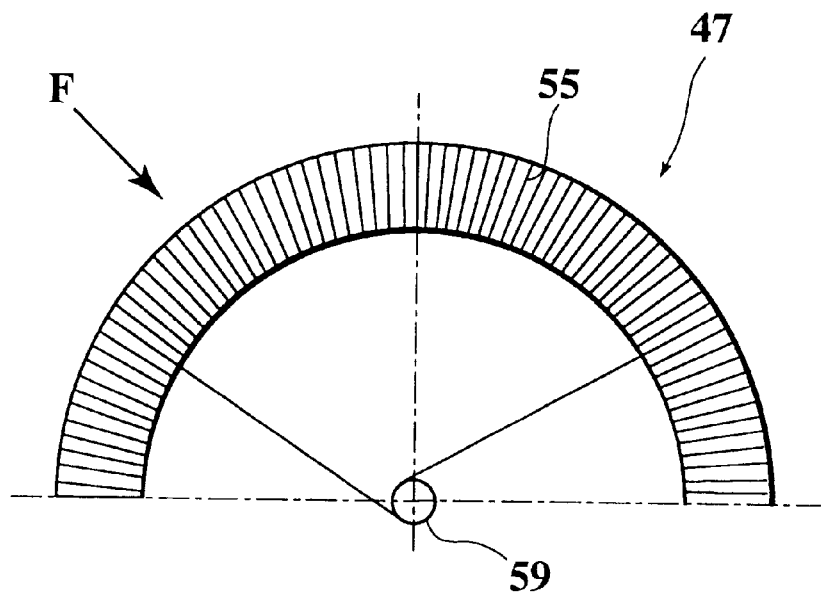
FIG. 9 is a view of one side of the taper ring of FIG. 6, including oil grooves.
Figure 10:
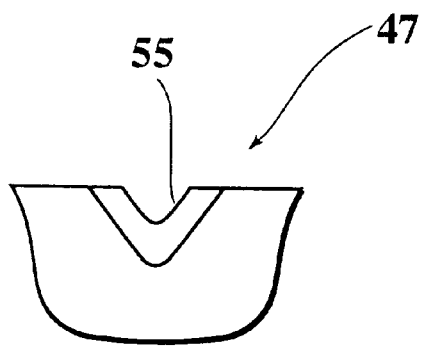
FIG. 10 is an enlarged fragmentary view of the taper ring of FIG. 9, including an oil groove, as it is seen along an arrow F of FIG. 9.
Figure 11:
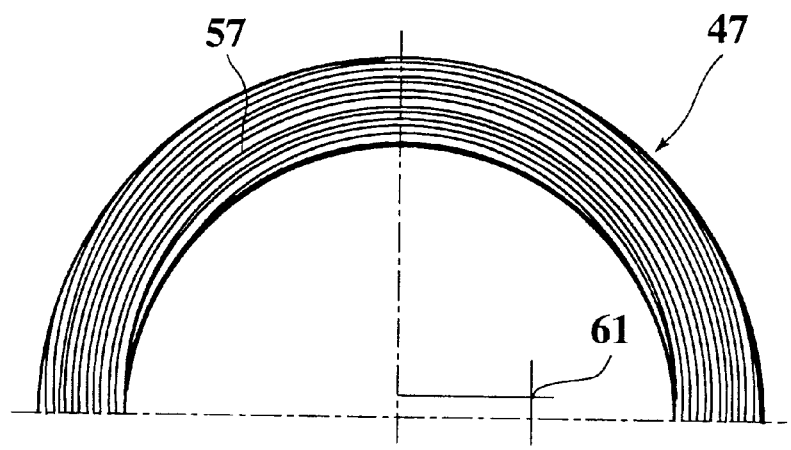
FIG. 11 is a view of another side of the taper ring of FIG. 6.
Figure 12:
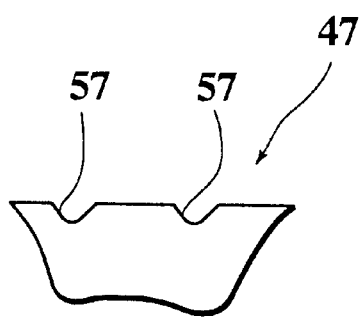
FIG. 12 is an enlarged fragmentary section of the taper ring of FIG. 11, including some oil grooves.

FIGS. 6 to 8 illustrate the taper ring 47, which is interposed (for the left conical clutch 35) between the conical surfaces 39, 41 and (for the right conical clutch 37) between the conical surfaces 43, 45, and is rotatable about the horizontal rotation axis, having its outer and inner circumferential surfaces (i.e. outer and inner frictional regions 47a, 47b) frictionally slipping along the conical surfaces 39/43, 41/45, respectively.

Upon development of a difference in drive torque distribution, the left and right conical clutches 35, 37 are each let in, as the taper ring 47 is urged outwards with axial components of reaction forces acting thereon from the side gear 27/29 meshing with the pinion gear 25. With resultant frictional forces acting as resistive forces, the developing difference is controlled to be suppressed.

Figure 4:
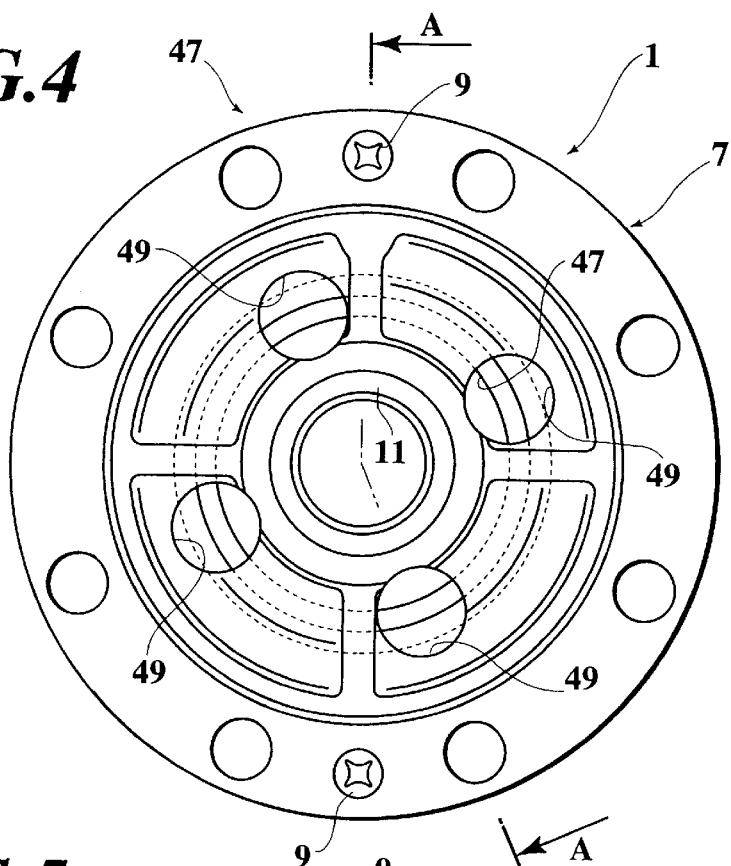
FIG. 4 is a side view of the differential apparatus of FIG. 3, as it is seen along an arrow B of FIG. 3.
Figure 5:
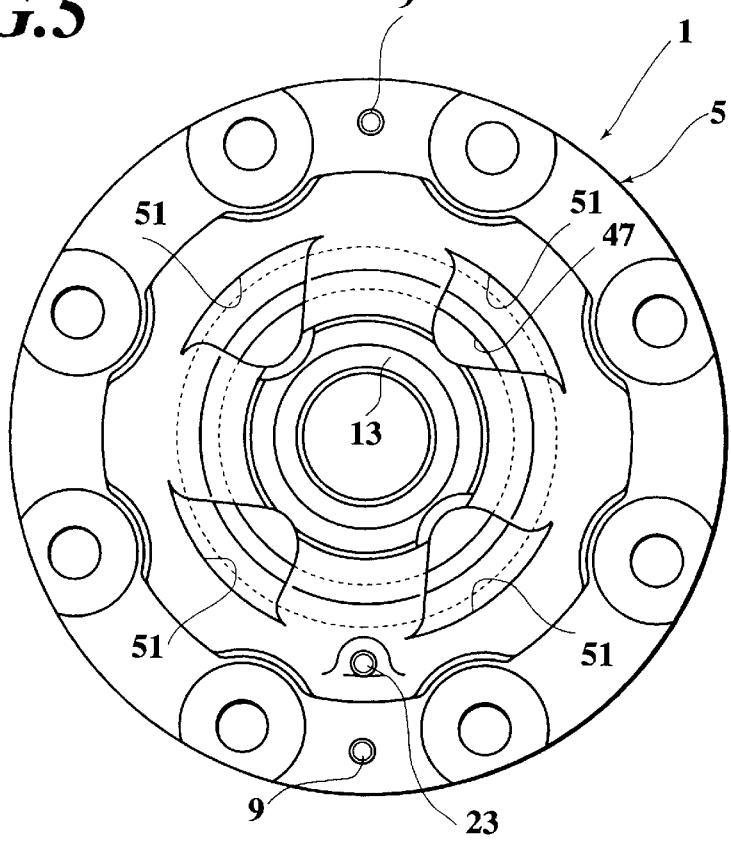
FIG. 5 is a side view of the differential apparatus of FIG. 3, as it is seen along an arrow C of FIG. 3.

FIG. 4 shows a total of four left openings 49 formed through (a left wall [in FIG. 3] of) the side cover 7 in an equi-angularly spaced manner, and FIG. 5 shows a total of four right openings 51 formed through (a right wall [in FIG. 3] of) the case body 5 in an equi-angularly spaced manner.

As the differential case 3 rotates, oil from the oil reservoir enters the differential case 3, through the left and right openings 49, 51 as well as through the spiral oil grooves 15, 17 in the bosses 11, 13, for lubrication to meshing or sliding parts of gears in the differential gear mechanism 33 and the conical clutches 35, 37. As the openings 49, 51 open at radial locations vicinal to the conical surfaces 41, 43 of the conical clutches 35, 37, respectively, elements of the clutches 35, 37 are directly and well lubricated.

As will be detailed later, the taper ring 47 is pressed into a taper form from a circular steel plate 53 (S35C) shown in FIG. 8.

The taper ring 47 is formed at one side thereof (FIG. 9) with a multiplicity of pseudo-radial oil grooves 55 (FIG. 10) extending in tangential directions at different points on a circumference of a relatively small circle 59 described about a center of the taper ring 47, and at the other side thereof (FIG. 11) with a plurality of circumferential oil grooves 57 (FIG. 12) extending along circumferences of circles described with different radii about an offset center 61 spaced off at a distance from the center of the taper ring 47.

Frictionally sliding regions of the taper ring 47 and the conical surfaces 39, 43, 41 and 45 are well lubricated with oil held by and supplemented from the oil grooves 55, 57.

Figure 13:
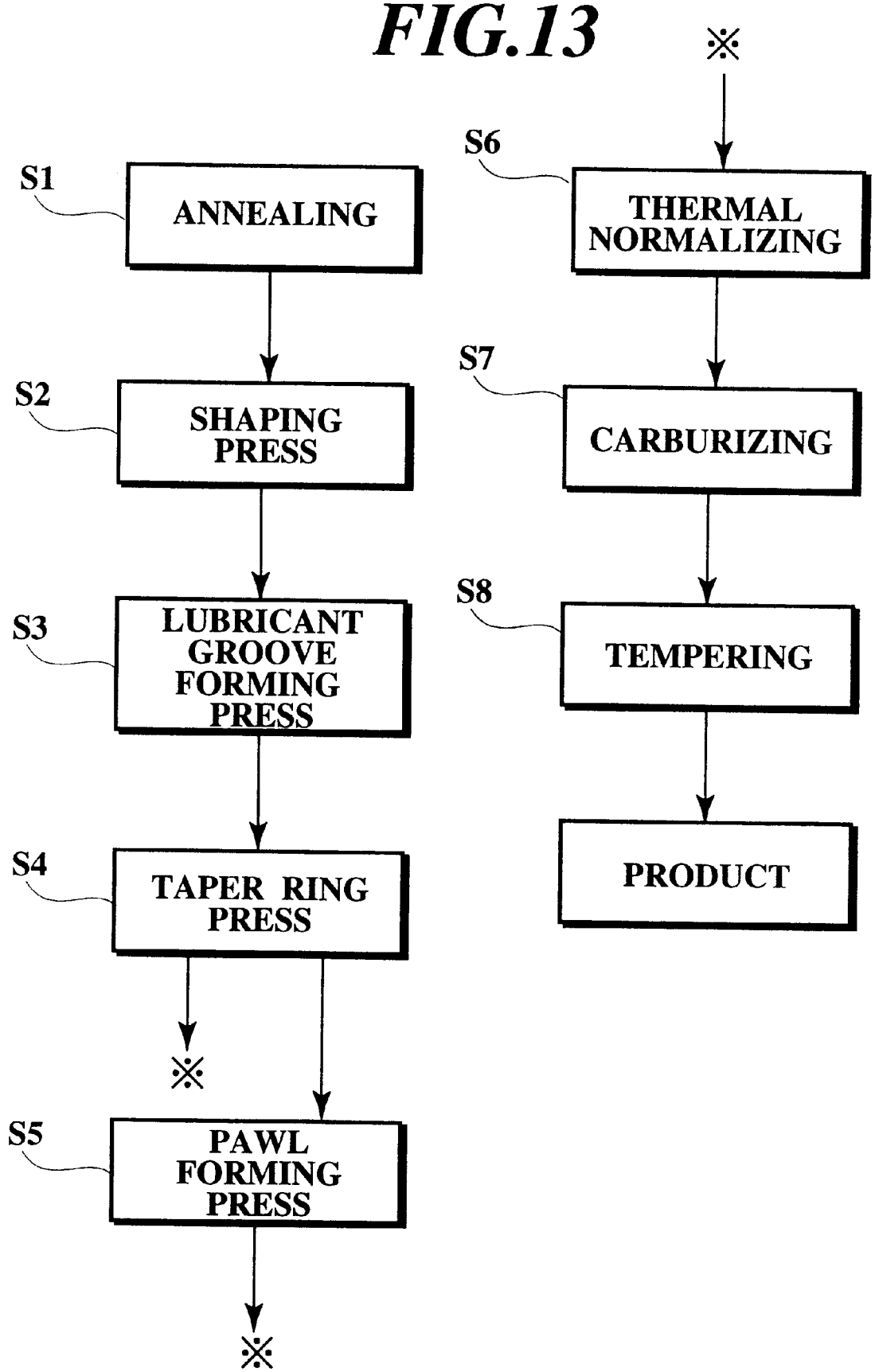
FIG. 13 is a flow chart of taper ring manufacturing processes according to the invention.

FIG. 13 shows a common flowchart of processing procedures for taper rings.

A processing procedure for the taper ring 47 will be described below, with reference to associated steps of the flowchart which includes an additional step (S5) for a later-described taper ring having pawls for engagement with a differential case.

At a step S1, an S35C steel plate (a material for the taper ring 47) is annealed.

At a step S2, the circular steel plate 53 is formed from the S35C by a shaping press after the annealing.

At a step S3, the oil grooves 55 and 57 are formed in the steel plate 53 by a lubricant groove forming press.

At a step S4, the steel plate 53 formed with the oil grooves 55, 57 is shaped in a form shown in FIGS. 6, 7 by a taper ring press. In this case, the, steel plate 53 has an inner diameter portion 63 (shown by a broken line in FIG. 8) clamped at both sides.

At a step S6, the steel plate 53 is subjected to a thermal normalizing process for removing residual stresses due to the preceding steps to prevent cracks in a subsequent carburizing process.

At a step S7, the taper ring 47 after the thermal normalizing is carburized.

At a step S8, a tempering is carried out.

Thereafter, scales and burrs are removed, providing the taper ring 47 as a complete product.

Figure 14:
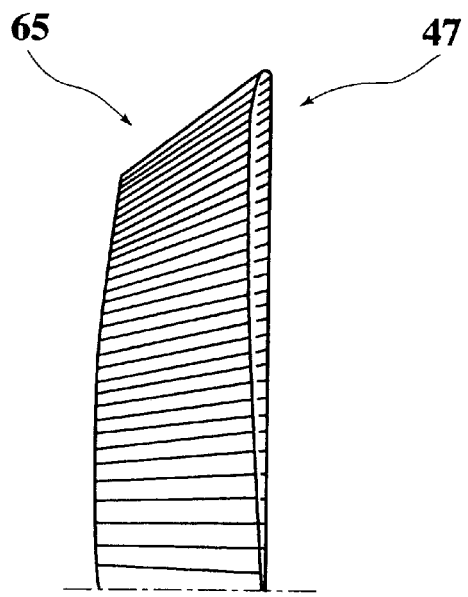
FIG. 14 is a side view of a taper ring having a deformed outer circumferential surface, as it is pressed without clamping an inner circumferential surface.
Figure 15:
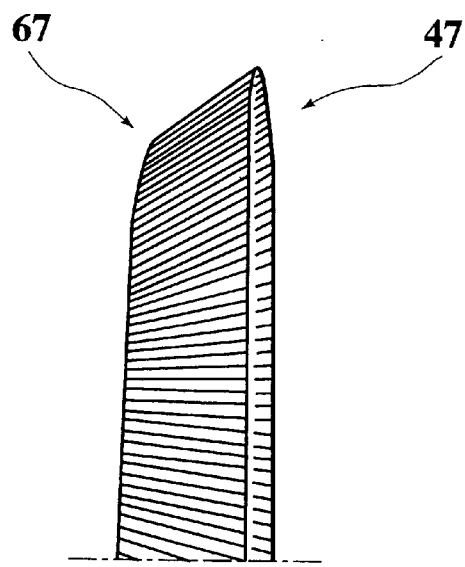
FIG. 15 is a side view of a taper ring having a normal outer circumferential surface, as it is pressed after an inner circumferential surface is clamped.

FIG. 14 shows a product of a procedure in which the inner diameter portion 63 of the steel plate 53 is not clamped (at the step S4), and FIG. 15 shows a product of the described procedure in which the steel plate 53 is clamped.

In the case the inner diameter portion 63 is not clamped, an outer peripheral part is inwardly deformed, as shown by an arrow 65 in FIG. 14. To the contrary, in the case the inner diameter portion 63 is clamped, the product is free from (deformed outer peripheral part, as shown by an arrow 67 in FIG. 15.

Therefore, the taper ring 47 after a clamping of the inner diameter portion 63 at the tapering press does not need a taper correction press for correcting an undue deformation of an outer peripheral part, thus avoiding an increase in processing cost.

In FIG. 7, r1 and r2 designate average friction radii at the side gear 27/29 side and the differential case 3 side in the conical clutch 35/37, respectively By disposing the taper ring 47 between the conical surfaces 39, 41 or the conical surfaces 43, 45, the friction radius r2 of the differential case 3 is rendered larger than the friction radius r1 of the side gear 27/29 depending on a thickness of the taper ring 47.

Accordingly, as a magnitude of frictional torque acting on the conical surface 39/43 of the differential case 3 becomes smaller than a magnitude of frictional torque acting on the conical surface 41/45 of the side gear 27/29, the conical surface 39/43 at the differential case 3 side has an enhanced anti-abrasive nature, with an improved durability.

The differential apparatus 1 is constituted as described.

In the differential apparatus 1, as the friction radius r2 of the conical surface 39/43 at the differential case 3 side is made larger than the friction radius r1 of the conical surface 41/45 at the side gear 27/29 side, the durability of the conical surface 39/43 at the differential case 3 side is improved, without needing the anti-abrasive nature of the differential case 3 to be increased to an extra level, avoiding a substantial increase in cost associated with an increase of surface hardness or a change of material.

Further, as the taper ring 47 is used, the difference between the friction radii r2, r1 can be adjusted in a voluntary manner by changing the thickness of the taper ring 47 or by changing a taper angle of an inner or outer peripheral part, thus making it possible to adjust an anti-abrasion nature of the differential case 3.

Further, as the taper ring 47 is rotatably disposed, the degree of abrasion of the differential case 3 and the side gear 27/29 due to a sliding of the taper ring 47 becomes almost uniform. As the frictional torque is borne by the differential case 3 and the side gear 27/29, their respective anti-abrasion natures are each enhanced, with an improved durability provided for the conical clutch 35/37.

Further, as the taper ring 47 is not engaged with the differential case 3 nor the side gear 27/29, no measures for the engagement are required, permitting a simple structure with a facilitated assemblage at a low cost.

Further, as the oil grooves 55, 57 are formed on both sides of the taper ring 47, the abrasion of the conical surface 39/43 at the differential case 3 side and that of the conical surface 41/45 at the side gear 27/29 side are additionally reduced, with the more improved durability.

Further, the taper ring 47 interposed between the differential case 3 and the side gear 27/29 hardly deforms even when the taper ring 47 is subjected to an undue meshing reaction force of the side gear 27/29, unlike the conventional example of FIG. 1.

Accordingly, it is not necessary to increase the thickness of the taper ring 47 or to change the material in order to increase the strength, avoiding an increase in weight and a cost increase associated with such changes.

Figure 16:
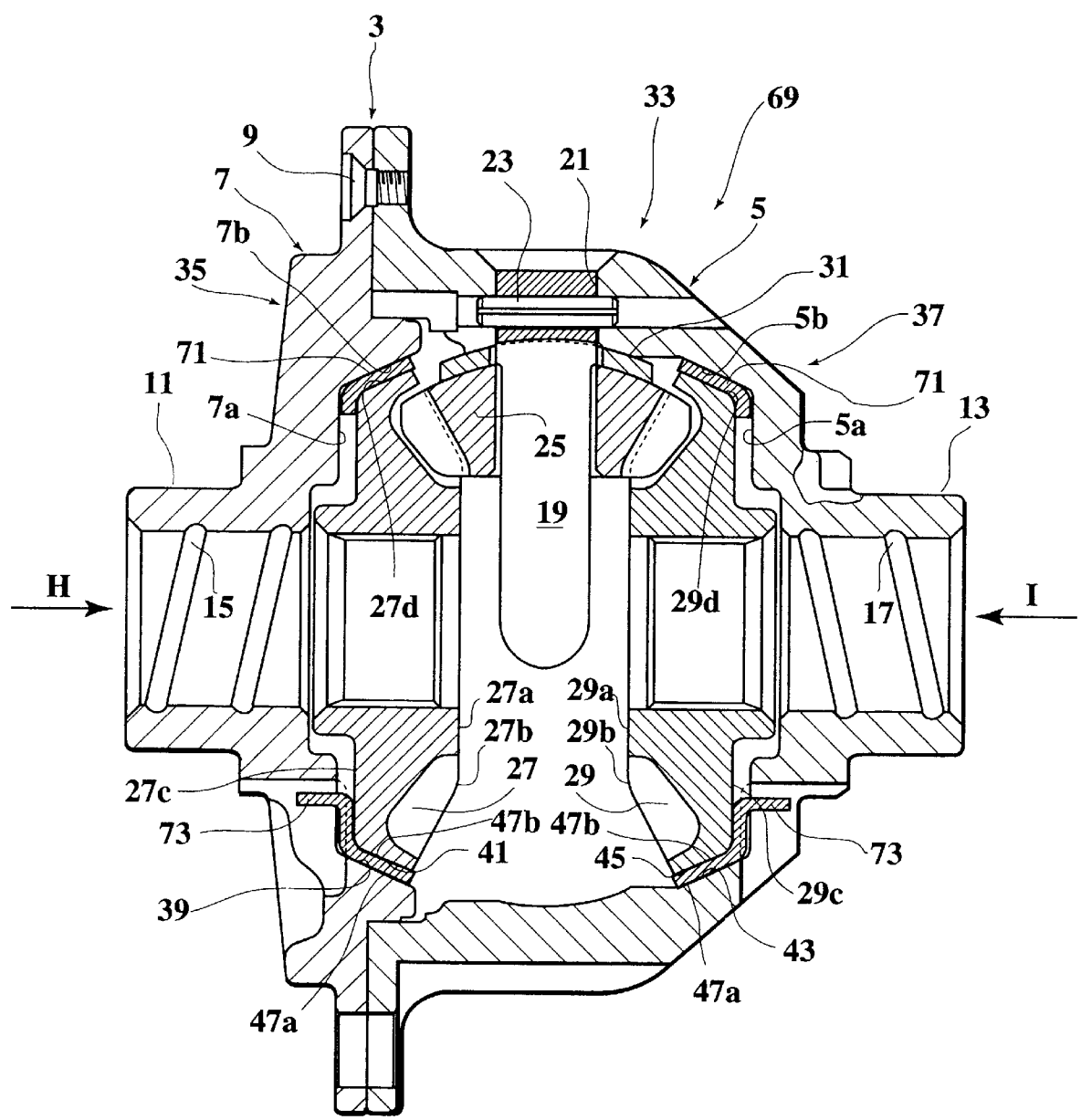
FIG. 16 is a section of a differential apparatus according to a second embodiment of the invention, as it is taken along line G—G of FIG. 17.
Figure 17:
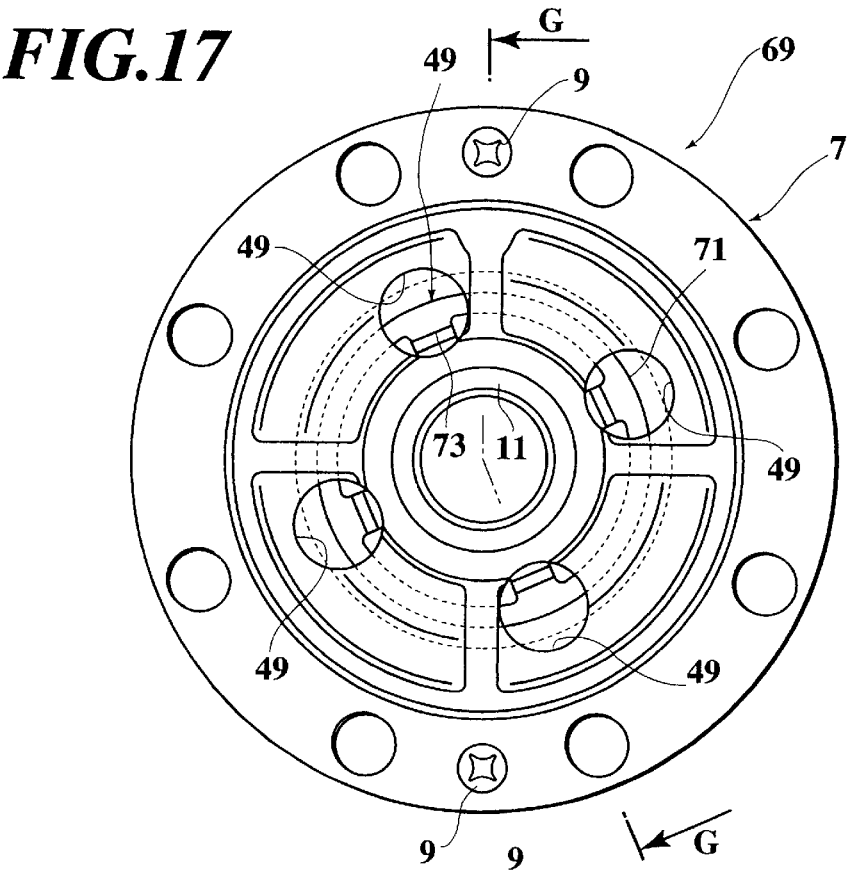
FIG. 17 is a side view of the differential apparatus of FIG. 16, as it is seen along an arrow H of FIG. 16.
Figure 18:
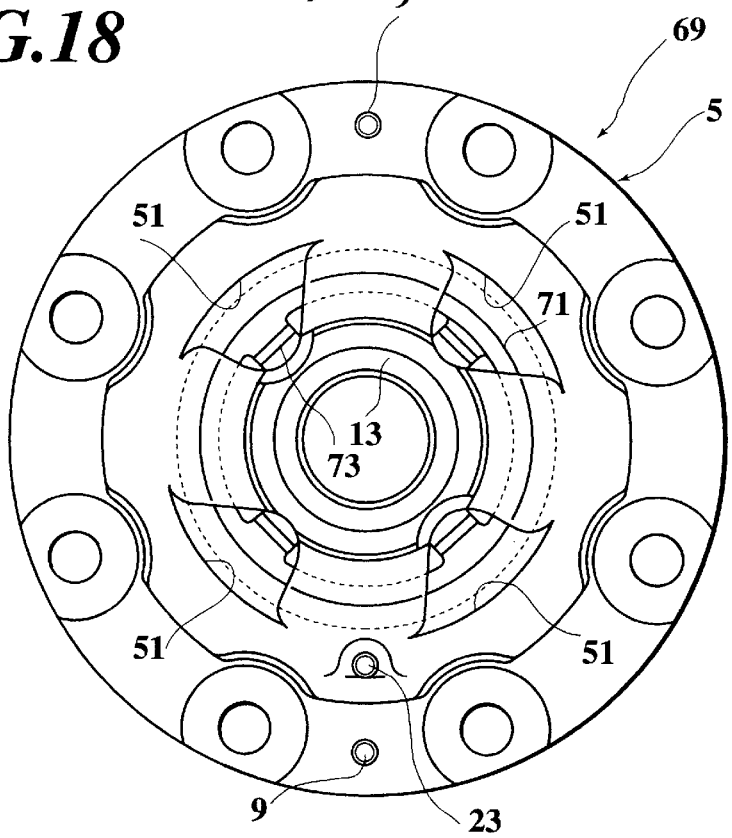
FIG. 18 is a side view of the differential apparatus of FIG. 16, as it is seen along an arrow I of FIG. 16.

There will be described below a differential apparatus according to a second embodiment of the invention, with reference to FIGS. 16 to 21. The second embodiment has features addressed to the first to the fourteenth aspect of the invention, including the fourth, the tenth and the fourteenth aspect. In FIGS. 16 to 18, designated at reference character 69 is the differential apparatus according to the second embodiment.

The differential apparatus 69 includes a differential gear mechanism 33, and a pair of left and right conical clutches 35, 37, and has a total of four equi-angularly spaced openings 49 (FIG. 17) formed through a left wall of a side cover 7 of a differential case 3 and a total of four equi-angularly spaced openings 51 (FIG. 18) formed through a right wall of a case body 5 of the differential case 3.

The left conical clutch 35 has a taper ring 71 interposed between radially outer and inner conical surfaces 39, 41 thereof, and the right conical clutch 37 has another taper ring 71 interposed between radially inner and outer conical surfaces 43, 45 thereof.

Figure 19:
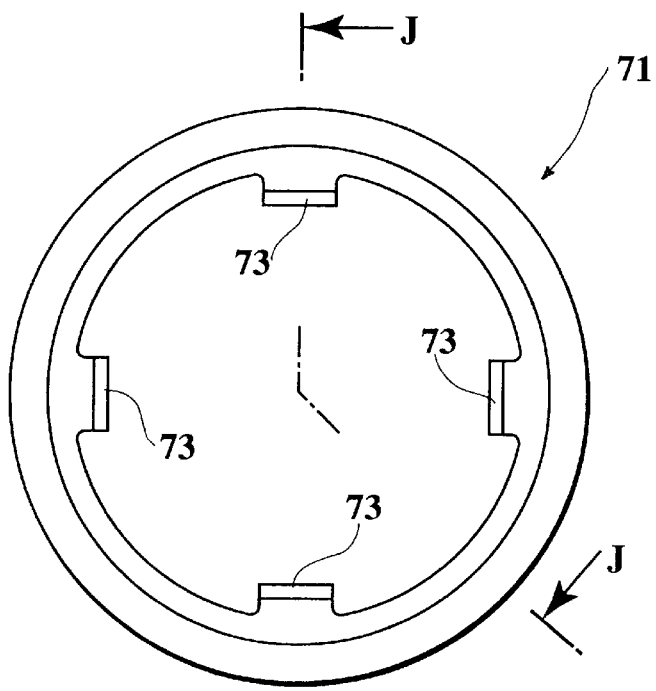
FIG. 19 is a front view of a taper ring of the differential apparatus of FIG. 16.
Figure 20:
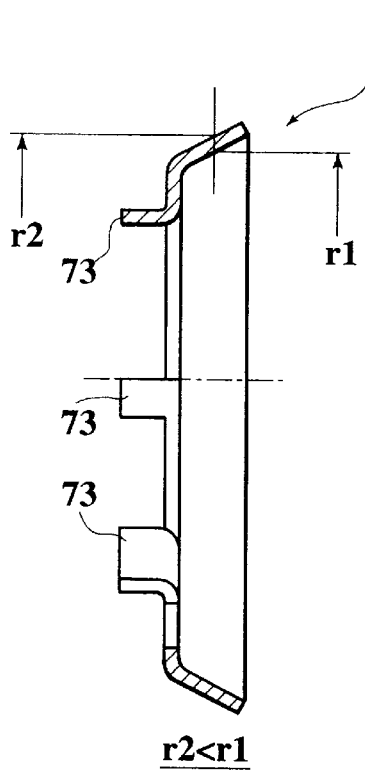
FIG. 20 is a section of the taper ring of FIG. 20, as it is taken along line J—J of FIG. 19.

As shown in FIGS. 19 and 20, each taper ring 71 has a total of four equi-angularly spaced pawls 73 as bent engagement parts thereof axially outwardly projecting from a body portion of a radially outer figure of a cone frustum, which pawls 73 are each loose-fitted (for the left clutch 35) in a corresponding one of the four openings 49 of the side cover 7 or (for the right clutch 37) in a corresponding one of the four openings 51 of the body case 5, and are each engageable therewith, as the taper ring 71 is slightly rotatable relative to the differential case 3, while it is frictionally slippingly rotatable relative to the side gear 27/29.

The taper ring 71 has on one side thereof a multiplicity of pseudo-radial oil grooves and on another side thereof a plurality of circumferential oil grooves, like the taper ring 47 of the first embodiment.

Figure 21:
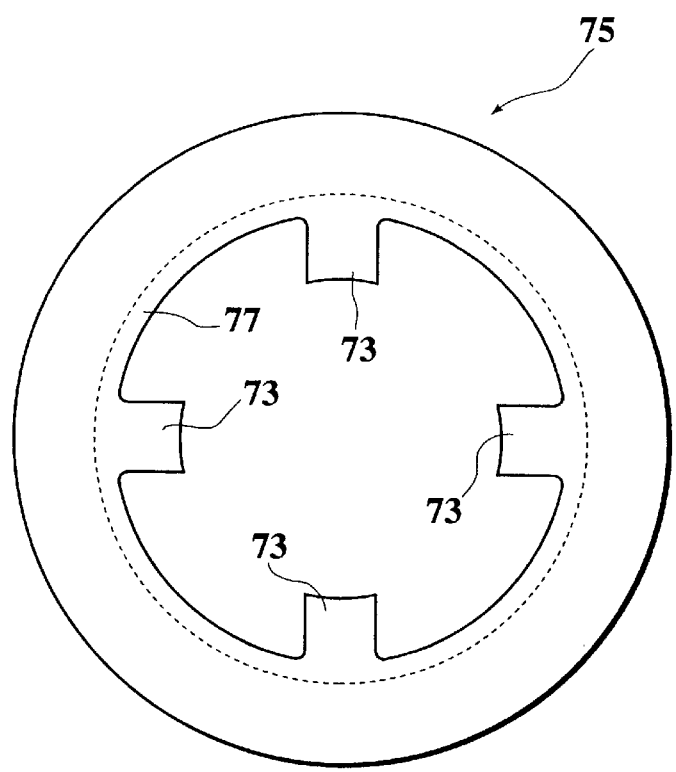
FIG. 21 is an exploded view of the taper ring of FIG. 19

The taper ring 71 is press-shaped in a taper form, from a circular steel plate 75 (S35C) shown in FIG. 21.

The taper ring 71 is manufactured in accordance with the flowchart of FIG. 13.

At a step S4, the steel plate 75 is pressed in a form illustrated in FIGS. 19 and 20.

In this case, the steel plate 75 has an inner diameter portion 77 (shown by a broken line in FIG. 21) clamped at both sides thereof to prevent deformations of an outer peripheral part of the taper ring 71.

At a step S5, the pawls 73 are pressed in form at an angle.

Preceding steps S1 to S3 and subsequent steps S6 to S8 are identical to those of the first embodiment.

Also in the second embodiment in which the inner diameter portion 77 of the steel plate 75 is clamped in a tapering process, the taper ring 71 does not need a taper correction press for correcting an undue deformation of an outer peripheral part, thus avoiding an increase in processing cost.

Moreover, the taper ring 71 interposed between the conical surfaces 39, 41 or 43, 45 has a sufficient thickness to ensure that an average friction radius r2 of the conical surface 39/43 at the differential case 3 side is effectively larger than an average friction radius r1 of the conical surface 41/45 at the side gear 27/29 side, like the first embodiment.

Accordingly, frictional torque acting on the conical surface 39/43 of the differential case 3 is smaller n magnitude than that acting on the conical surface 41/45 of the side gear 27/29, and the conical surface 39/43 of the differential case 3 has an enhanced anti-abrasive nature, with an improved durability.

The differential apparatus 69 is constituted as described.

Also in the differential apparatus 69, the friction radius r2 of the conical surface 39/43 at the differential case 3 side is larger than the friction radius r1 of the conical surface 41/45 at the side gear 27/29 side, as described, and the durability of the conical surface 39/43 at the differential case 3 side is improved, without needing the anti-abrasive nature of the differential case 3 to be increased to an extra level, avoiding a substantial increase in cost associated with an increase of surface hardness or a change of material.

The taper ring 71 allows a voluntary design, permitting a difference between the friction radii r2, r1 to be adjusted by changing the thickness of the taper ring 71 or by changing a taper angle of an inner or outer peripheral part, hereby adjusting the anti-abrasive nature of the differential case 3.

As the oil grooves are formed on both sides of the taper ring 71, the abrasion of the conical surface 39/43 at the differential case 3 side and that of the conical surface 41/45 at the side gear 27/29 side are reduced, with an improved durability.

When engaged with the differential case 3, the taper ring 71 is integrally rotated therewith, without unfavorable abrasion over the conical surface 39/43 at the differential case 3 side, with a possibly improved anti-abrasive nature and reduced potential costs such as for a case hardening or in material selection.

Moreover, the conical surface 39/41 at the differential case 3 side is substantially kept from a significant frictional slipping on the taper ring 71, and may be processed with a relatively rough accuracy and a smaller number of process steps, resulting in a reduced cot.

Also the taper ring 71 is interposed between the differential case 3 and the side gear 27/29, and hardly deforms even when subjected to an undue meshing reaction force of the side gear 27/29, unlike the conventional example of Fig. It therefore is unnecessary to increase the thickness of the taper ring 71 or to change the material in order to increase the strength, avoiding an increase in weight and a cost increase associated with such changes.

Further, the conical surface 39/43 of the differential case 3 bears a load due to frictional torque of the taper ring 71, permitting the pawls 73 to be formed with a moderate rigidity in an inexpensive manner.

It will be seen that the present invention may be applied to a variety of types of differential apparatus, including a bevel gear type and others, e.g. a planetary gear type, if its differential gear mechanism has at an output end thereof a side gear receiving reaction forces or thrust forces due to its meshing, like a differential gear mechanism in which a pair of side gears are connected to each other through pinion gears frictionally slidably rotatably fitted in accommodation holes formed in a rotatable differential case.

In the embodiments described, the sloped surfaces 39/43, 41/45 of each clutch 35/37 may preferably be curvilinear in section, at a top and/or conical side of the cone frustum.

It will also be seen that the invention may be applied to any of a front differential for differentially distributing drive torque from an engine to a pair of front road wheels of an automobile, a rear differential for differentially distributing drive torque from an engine to a pair of rear road wheel of an automobile, and a center differential for differentially distributing drive torque from an engine between a front drive power train for driving front wheels of an automobile and a rear drive power train for driving rear wheels of the automobile.

While preferred embodiments of the present invention have been described using specific terms, such description is for illustrative purposes, and it is to be understood that changes and variations may be made without departing from the spirit or scope of the following claims.

What is claimed is:

1. A differential apparatus comprising:
    a differential gear mechanism including
        a differential case to be driven to rotate with (drive power from an engine,
        a pinion gear rotatably supported on the differential case, and
        a pair of side gears as output members coupled to each other through the pinion gear; and
    a difference limiting clutch to be let in with a meshing reaction force of either side gear, the difference limiting clutch comprising
        slidingly rotatable sloped surfaces provided on a side on which either side gear is disposed and on a side the differential case is disposed, respectively, wherein:
    the difference limiting clutch is rotatable relative to either side gear and the differential case;
    the either side gear and the differential case have frictional coefficients thereof substantially equivalent to each other; and
    an average friction coefficient of the sloped surface on the differential case side is larger than an average friction coefficient of the sloped surface on the side gear side.

2. A differential apparatus according to claim 1, wherein the difference limiting clutch further comprises a taper ring interposed between the either side gear and the differential case to have the average friction coefficient of the sloped surface on the differential case side larger than the average friction coefficient of the sloped surface on the side gear side.

3. A differential apparatus according to claim 2, wherein the taper ring is rotatable relative to the either side gear and the differential case.

4. A differential apparatus according to claim 2, wherein the taper ring has an engaging part engageable with the differential case.

5. A differential apparatus according to claim 1, further comprising at least one of
    an oil groove formed in the sloped surface on the differential case side, and
    an oil groove formed in a sliding surface of a taper ring interposed between the either side gear and the differential case.

6. A differential apparatus comprising:
    a differential case to be rotated about a first rotation axis with drive torque input thereto,
    a pinion gear integrally rotatable with the differential case about the first rotation axis and free rotatable about a second rotation axis crossing the first rotation axis;
    a first side gear rotatable about and slidable along the first rotation axis relative to the differential case, the first side gear being comprised of
        a body portion having an outer wall facing an inner wall of the differential case, and
        a toothed portion meshing with the pinion gear for outputting a first fraction of the drive torque distributed thereto;
    a second side gear rotatable about the first rotation axis relative to the differential case, the second side gear meshing with the pinion gear for outputting a second fraction of the drive torque distributed thereto; and
    a frictional clutch rotatable about the first rotational axis and adapted to be let in for frictionally slippingly coupling the inner wall of the differential case with the outer wall of the body portion of the first side gear, when a difference develops between the first and second fractions of the drive torque, the frictional clutch comprising:
- a first frictional region on the inner wall of the differential case, the first frictional region having a radially outer figure of a frustum of a first cone symmetrical about the first rotation axis;
- a second frictional region on the outer wall of the body portion of the first side gear, the second frictional region having a radially outer figure of a frustum of a second cone symmetrical about the first rotation axis;
- an annular plate member interposed between the first and second frictional regions and rotatable about the first rotation axis relative to the differential case and the first side gear;
- a third frictional region on an outer side of the annular plate member, the third frictional region being frictionally slidably engageable over a total area thereof with a total area of the first frictional region;
- a fourth frictional region on an inner side of the annular plate member, the fourth frictional region being frictionally slidably engageable over a total area thereof with a total area of the second frictional region; and
- frictional force unbalancing means for unbalancing an average frictional force acting between the first and third frictional regions relative to an average frictional force acting between the second and fourth frictional regions, as the frictional clutch is let in.

7. A differential apparatus according to claim 6, wherein the frictional force unbalancing means comprises a difference between an average friction radius of the total area of the first frictional region with respect to the total area of the third frictional region and an average friction radius of the total area of the second frictional region with respect to the total area of the fourth frictional region.

8. A differential apparatus according to claim 6, wherein the frictional force unbalancing means comprises a thickness of the annular plate member.

9. A differential apparatus according to claim 6, wherein the frictional force unbalancing means comprises a difference between the radially outer figures of the frustums of the first and second cones.

10. A differential apparatus according to claim 6, wherein the frictional force unbalancing means comprises an opening in one of
the inner wall of the differential case and
the annular plate member, and
a projection on the other thereof, the projection being engageable with the opening, as the annular plate member rotates relative to the differential case.

11. A differential apparatus according to claim 6, wherein the annular plate member has a plurality of oil grooves formed in one of the inner and outer sides thereof.

12. A differential apparatus according to claim 11, wherein the plurality of oil grooves extend in different tangential directions of a circle having a center thereof on the first rotation axis.

13. A differential apparatus according to claim 11, wherein the plurality of oil grooves extend in a circumferential direction of a circle having a center thereof radially offset from the first rotation axis.

14. A differential apparatus according to claim 6, wherein:
the inner wall of the differential case is formed with an opening; and
the annular plate member has a projection loose-fitted in the opening.

15. A differential apparatus according to claim 6, wherein the frictional clutch is rotatable relative to the differential case.

* * * * *